United States Patent
Nishida et al.

(10) Patent No.: US 9,243,574 B2
(45) Date of Patent: Jan. 26, 2016

(54) ENGINE CONTROL UNIT

(75) Inventors: Kenji Nishida, Waiko (JP); Tetsuya Kaneko, Waiko (JP); Tomiyuki Sasaki, Waiko (JP); Koji Aoki, Waiko (JP); Ranju Imao, Waiko (JP); Kazuto Fukuzawa, Waiko (JP)

(73) Assignee: HONDA MOTOR CO., LTD., Tokyo (JP)

( * ) Notice: Subject to any disclaimer, the term of this patent is extended or adjusted under 35 U.S.C. 154(b) by 437 days.

(21) Appl. No.: 13/326,884

(22) Filed: Dec. 15, 2011

(65) Prior Publication Data

US 2012/0158320 A1   Jun. 21, 2012

(30) Foreign Application Priority Data

Dec. 17, 2010  (JP) ................................ 2010-282089

(51) Int. Cl.
| | | |
|---|---|---|
| G06F 19/00 | (2011.01) | |
| G01M 15/05 | (2006.01) | |
| F02D 41/00 | (2006.01) | |
| F02D 41/14 | (2006.01) | |
| G01P 3/488 | (2006.01) | |
| G01D 5/244 | (2006.01) | |
| F02P 5/15 | (2006.01) | |
| G01D 5/14 | (2006.01) | |

(52) U.S. Cl.
CPC ........ *F02D 41/0097* (2013.01); *F02D 41/1497* (2013.01); *G01D 5/24428* (2013.01); *G01P 3/488* (2013.01); *F02D 2200/1004* (2013.01); *F02P 5/151* (2013.01); *G01D 5/147* (2013.01)

(58) Field of Classification Search
CPC ..... G06F 19/00; G01M 15/05; G01M 17/007; G01M 15/045; G01M 15/12; G01M 15/06; G01M 15/102; G01P 3/488; F02D 41/1497; F02D 2200/1004; F02D 2200/1006

USPC .......................................................... 702/41
See application file for complete search history.

(56) References Cited

U.S. PATENT DOCUMENTS

| | | | |
|---|---|---|---|
| 6,575,143 B2 * | 6/2003 | Uemura et al. ............... | 123/490 |
| 7,949,457 B2 * | 5/2011 | Ishikawa et al. ............. | 701/102 |
| 2003/0168028 A1 | 9/2003 | Isoda et al. | |
| 2007/0204827 A1 * | 9/2007 | Kishibata et al. .......... | 123/179.5 |
| 2011/0214495 A1 * | 9/2011 | Nishiumi ................... | 73/114.49 |

FOREIGN PATENT DOCUMENTS

| | | | |
|---|---|---|---|
| EP | 0799983 B1 * | 6/2003 | |
| JP | 7-033809 A | 4/1995 | |
| JP | 2003-343231 A | 12/2003 | |
| JP | 2009-203976 A | 9/2009 | |

\* cited by examiner

*Primary Examiner* — John Breene
*Assistant Examiner* — Lynda Dinh
(74) *Attorney, Agent, or Firm* — Westerman, Hattori, Daniels & Adrian, LLP

(57) ABSTRACT

To prevent a reduction in engine load detection accuracy due to variations in reluctor size within mass production tolerances, an engine control unit includes a pulse generator PC that detects a reluctor to output crank pulses. An angular velocity calculating unit calculates a first crank angular velocity on the basis of an interval between two crank pulses output in a predetermined section near compression top dead center TDC, and detects near overlap top dead center OLP the same reluctor used for calculating the first crank angular velocity to calculate a second crank angular velocity on the basis of an interval between generated two crank pulses. An engine load estimating unit calculates, as an engine load, a difference between the first crank angular velocity and the second crank angular velocity. The engine load is indicated mean effective pressure over a whole cycle including negative work done by the engine.

12 Claims, 6 Drawing Sheets

ENGINE CONTROL UNIT

TECHNICAL FIELD

This application claims the benefit of priority of Japanese Application No. 2010-282089 filed on Dec. 17, 2010.

The present disclosure relates to an engine control unit, and more particularly, to an engine control unit suitable for improving detection accuracy of the angular velocity of a crankshaft to accurately estimate an engine load.

BACKGROUND OF THE INVENTION

When combustion is performed in a cylinder, the angular velocity of a crankshaft is increased from a first angular velocity ωa to a second angular velocity ωb by combustion pressure. Therefore, when I represents the rotational moment of inertia of an engine, kinetic energy E increases from ($\frac{1}{2}$)·Iωa² to ($\frac{1}{2}$)·Iωb². In other words, torque is produced according to an increasing amount of this kinetic energy, $\Delta E = (\frac{1}{2}) \cdot I \cdot (\omega b^2 - \omega a^2)$, and hence the produced torque is proportional to $(\omega b^2 - \omega a^2)$.

In this manner, the produced torque is obtained from the difference between the square of the first angular velocity ωa and the square of the second angular velocity ωb. Therefore, in an engine control method, for example as disclosed in Patent Literature 1, torque variation is calculated based on the produced torque obtained from the difference between the square of the first angular velocity ωa and the square of the second angular velocity ωb.

SUMMARY OF THE INVENTION

According to the control method disclosed in the Patent Literature 1, on the basis of the time required for from 30° to 60° crankshaft rotation after compression top dead center, the first angular velocity of the crankshaft during this section is obtained. Also, on the basis of the time required for from 90° to 120° crankshaft rotation after compression top dead center, the second angular velocity of the crankshaft during this section is obtained. Here, the crankshaft position, i.e., the crank angle, is obtained by detecting, with a pickup sensor, a plurality of spaced-apart reluctors provided at certain intervals around a rotor that rotates synchronously with the rotation of the crankshaft. For this reason, in the related art method, the first angular velocity and the second angular velocity are detected using reluctors corresponding to different crank angles.

However, there has been a problem in that the reluctor width and spacing of arrangement (the reluctor size) vary within mass production tolerances, thereby causing a reduction in the estimated accuracy of produced torque.

Accordingly, an object of the present disclosure is to provide an engine control unit in which the influence of variations in reluctor size is eliminated to enable an improvement in the estimated accuracy of an engine load.

To achieve the above-mentioned object, a first feature of the present disclosure is that an engine control unit including a pulse generator that detects a reluctor provided on a crank pulser rotor rotating synchronously with a crankshaft of an engine to output crank pulses, includes: angular velocity calculating means that calculates a first crank angular velocity on the basis of an interval between two crank pulses output in a predetermined section near compression top dead center of the engine, and detects near overlap top dead center the same reluctor used for calculating the first crank angular velocity to calculate a second crank angular velocity on the basis of an interval between two crank pulses output from the pulse generator; and engine load estimating means that estimates an engine load from a difference between the first crank angular velocity and the second crank angular velocity.

Also, a second feature of the present disclosure is that a relationship between the reluctor and the crankshaft is set in such a manner that the two crank pulses to be output in each of the predetermined sections near the compression top dead center and the overlap top dead center are output in positions immediately before the compression top dead center and the overlap top dead center.

Furthermore, a third feature of the present disclosure is that a relationship between the reluctor and the crankshaft is set in such a manner that the two crank pulses to be output in each of predetermined sections near the compression top dead center and the overlap top dead center are output in positions straddling the compression top dead center and the overlap top dead center, respectively.

Also, a fourth feature of the present disclosure is that the two crank pulses to be output in each of the predetermined sections near the compression top dead center and the overlap top dead center are output at the time of detection of front and rear ends of a single reluctor provided on the crank pulser rotor.

Moreover, a fifth feature of the present disclosure is that the two crank pulses to be output in each of predetermines sections near the compression top dead center and the overlap top dead center are output at the time of detection of predetermined two of a plurality of reluctors provided on the crank pulser rotor.

Also, a sixth feature of the present disclosure is that the engine load estimating means estimates the engine load from indicated mean effective pressure over a whole cycle of the engine including a pumping loss that is negative work done by the engine.

According to the first to sixth features, when an increment in crank angular velocity is calculated at two points in one cycle so as to calculate a crank angular velocity variation, a reluctor used for detecting the crank angular velocity at one point (near the compression top dead center) is also used for detecting the crank angular velocity at the other point (near the overlap top dead center). Thus, it is possible to prevent a reduction in engine load detection accuracy due to variations in the reluctor machining accuracy within mass production tolerances.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
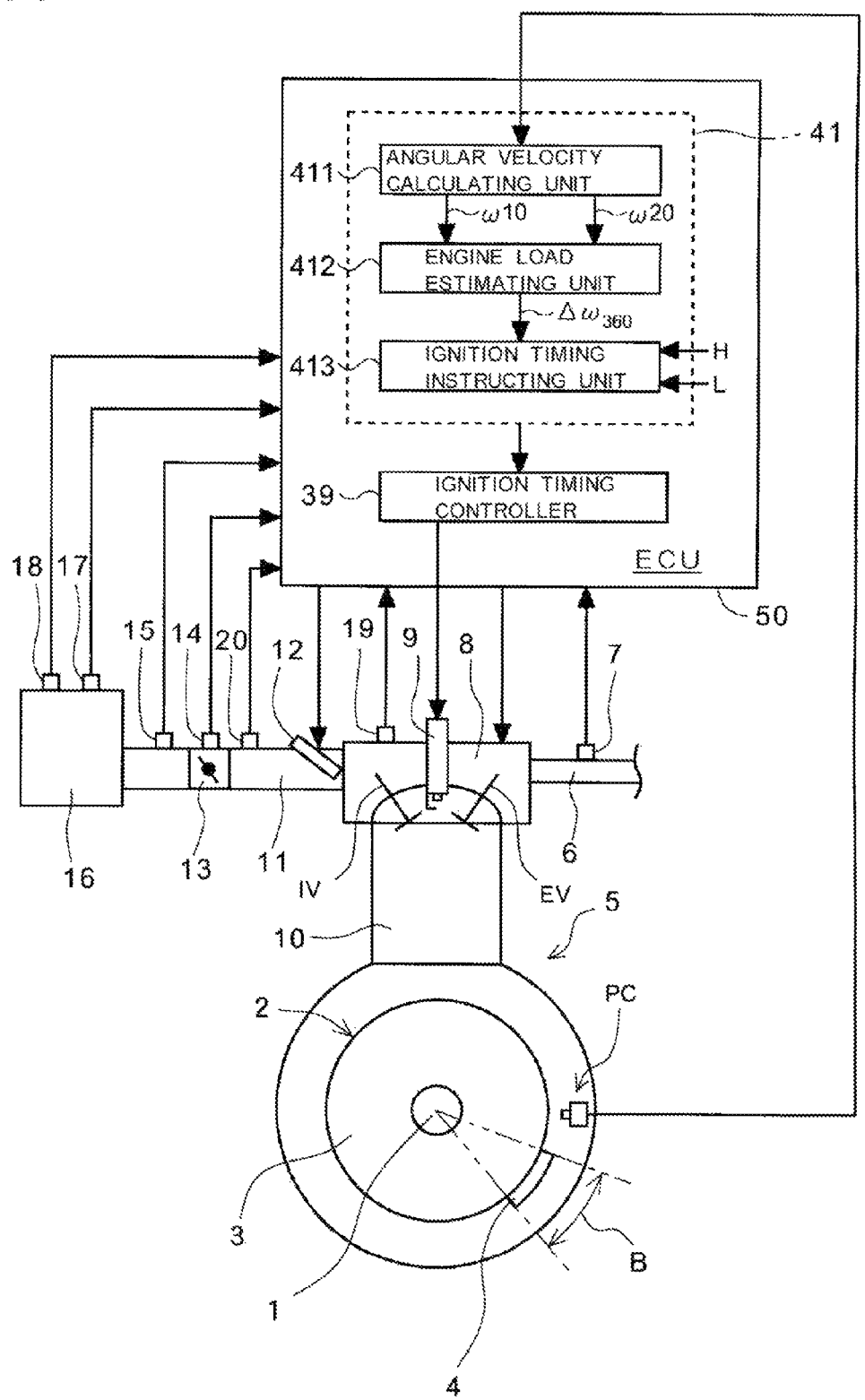
FIG. 1 is a block diagram illustrating the system configuration of an engine control unit according to an embodiment of the present disclosure.

Hereinafter, a preferred embodiment of the present disclosure will be described in detail with reference to the accompanying drawings. FIG. 1 is a block diagram illustrating the system configuration of an engine control unit according to an embodiment of the present disclosure.

Referring to FIG. 1, a cylinder head 8 is attached to an upper portion of a cylinder 10 of a four-stroke single-cylinder engine 5. The engine 5 can include a variable valve timing (VVT: Variable Valve Timing) mechanism. The VVT mechanism drives a control motor, not shown, based on drive commands from an ECU 50 to thereby change the valve timing of an intake valve IV and an exhaust valve EV. Along with the change of the valve timing, a valve lift amount also changes. A variable state of the valve timing performed by the VVT mechanism is transmitted to the ECU 50 by a sensor 19 for detecting a rotational angle of the control motor, etc.

A crank pulser rotor 2 is mounted on a crankshaft 1 of the engine 5. The crank pulser rotor 2 is composed of a rotor 3 rotating synchronously with the crankshaft 1, and a reluctor 4 protruding in an outer peripheral direction from the rotor 3. The reluctor 4 has a width B (for example, 30°) over a predetermined angular range in a circumferential direction of the rotor 3. A magnetic pickup pulse generator PC is provided facing an outer periphery of the rotor 3. The pulse generator PC outputs an "on" signal in a position where the reluctor 4 is located, and an "off" signal in a position where the reluctor 4 is not located. In other words, a front end in a rotational direction of the reluctor 4 is detected by the "on" signal of the pulse generator PC, and a rear end thereof is detected by the "off" signal. A detection signal, that is, a crank pulse, is input to the ECU 50. The crank pulser rotor 2 is mounted on the crankshaft 1 while being positioned such that the reluctor 4 is located near top dead center.

Figure 2:
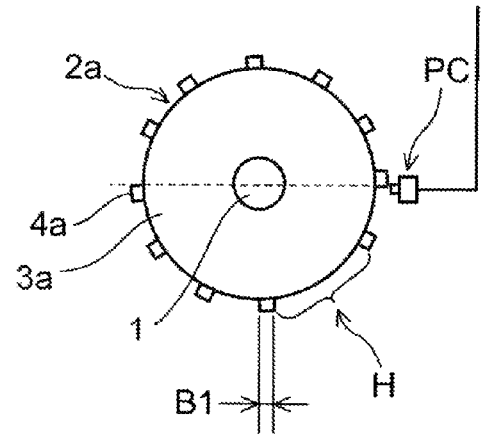
FIG. 2 is a front elevation illustrating an example of a crank pulser rotor having a plurality of reluctors.

It should be noted that, as for the crank pulser rotor 2, a crank pulser rotor having a plural of reluctors may be used. FIG. 2 is a front elevation of a crank pulser rotor having the plural of reluctors. In FIG. 2, a crank pulser rotor 2a rotating synchronously with the crankshaft 1 is mounted. A plural of reluctors 4a are arranged at equal spaces (for example, spaced every 30°) on the outer periphery of a rotor 3a, excluding one non-toothed portion (a portion without the reluctors 4a) H. The pulse generator PC inputs, to the ECU 50, detection signals of front and rear ends of the reluctors 4a. It should be noted that, in a case where the crank pulser rotor 2a is used, a width B1 of each reluctor 4a may be smaller than the width B of the reluctor 4 as shown in FIG. 1 because only either one of the crank pulses output corresponding to the front and rear ends detected by the pulse generator PC is used.

Referring back to FIG. 1, an air cleaner box 16 for intake air filtration is attached to one end of an intake pipe 11. An intake-air temperature sensor 17 and an atmospheric pressure sensor 18 are provided within the air cleaner box 16. Also, an air flow sensor 15 for measuring an intake air quantity; a throttle valve opening sensor 14 for detecting a rotational angle of a throttle valve 13, and an intake pressure sensor 20 for detecting an intake pressure are attached to the intake pipe 11. An ignition system 9 is provided on an upper portion of a combustion chamber. A fuel injection valve 12 is disposed on the intake pipe 11 downstream of the throttle valve 13. An oxygen concentration sensor 7 is attached to an exhaust pipe 6.

The ECU 50 includes a rotational fluctuation controller 41. The rotational fluctuation controller 41 includes an angular velocity calculating unit 411 that calculates, based on the length of time that the input detection signal of the pulse generator PC is kept "on", a first crank angular velocity ω10 at compression top dead center of the engine 5, and a second crank angular velocity ω20 at a position when the crankshaft 1 completes its 360-degree rotation (i.e. one revolution) from the compression top dead center, that is, the second crank angular velocity ω20 at overlap top dead center. Additionally, the rotational fluctuation controller 41 includes an engine load estimating unit 412 that calculates a difference between the first crank angular velocity ω10 and the second crank angular velocity ω20, that is, a crank angular velocity variation Δω360, to estimate an engine load. An ignition timing controller 39 provides an ignition signal to the ignition system 9 at a predetermined ignition timing according to an ignition timing instruction input from an ignition timing instructing unit 413.

The rotational fluctuation controller 41 and the ignition timing controller 39 can be realized by using microcomputer programs. The ECU 50 includes a microcomputer for executing the programs. In this manner, the ECU 50 has the function of performing ignition timing control and engine rotational fluctuation suppression control on the basis of the crank angular velocity variation Δω360.

Figure 3:
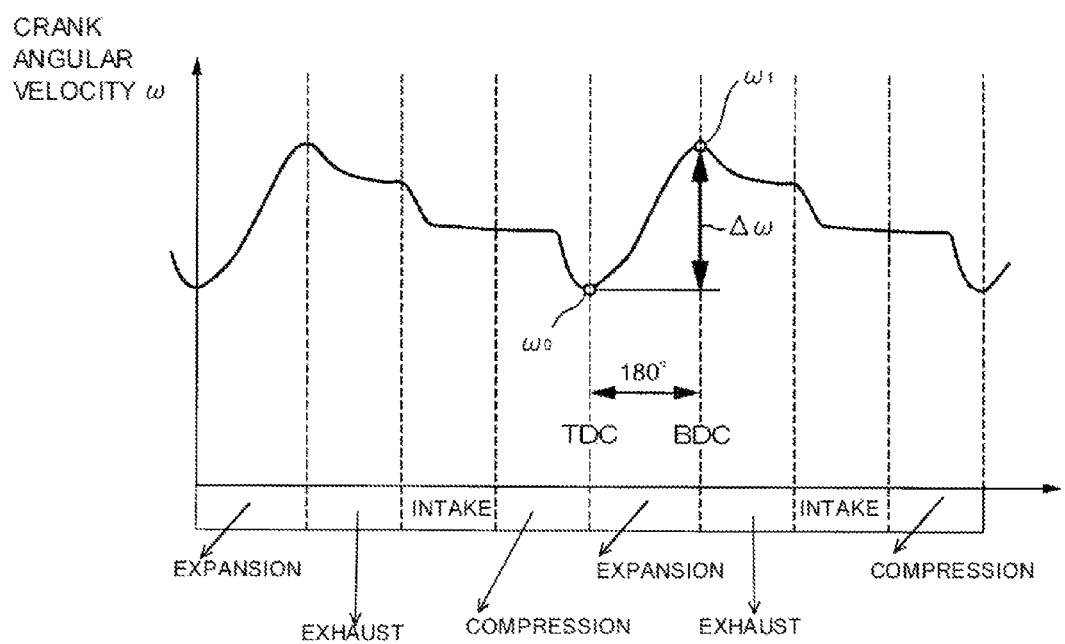
FIG. 3 is a time chart illustrating the relationship between a crank pulse and variation in a crank angular velocity ω, during one cycle.

Next, variation in crank angular velocity will be described with reference to FIG. 3. FIG. 3 is a time chart illustrating the relationship between the crank pulse and variation in crank angular velocity ω, during one cycle.

In FIG. 3, the angular velocity ω of the crankshaft 1 varies periodically, due to the varying torque in the crankshaft, with an average rotational speed Ne as a center, according to one cycle of the engine, i.e., four strokes of compression, expansion, exhaust, and intake. A minimum angular velocity ω0 appears near compression top dead center TDC. A maximum angular velocity ω1 appears at the end of the expansion stroke, in other words, near exhaust bottom dead center BDC (a crank angle in the range of from 150° to 180°).

Specifically, in the compression stroke, the crank angular velocity ω decreases due to compression resistance caused by an increase in in-cylinder pressure. In the expansion stroke, on the other hand, crank rotational energy is generated by an increase in in-cylinder pressure due to combustion. Due to this, the crank angular velocity ω turns to an increase. The crank angular velocity ω decreased to the minimum value ω0 in the compression stroke reaches the maximum crank angular velocity ω1 immediately before the end of the expansion stroke. After that, the crank angular velocity ω continues to decrease due to pump work, such as mechanical friction resistance in the engine, burned gas exhaust resistance in the exhaust stroke, and intake resistance in the intake stroke, and then reaches again the intake and compression strokes.

According to this variation in the crank angular velocity ω, the minimum crank angular velocity ω0 detected near the compression top dead center TDC is lower than the average rotational speed Ne. On the other hand, the maximum crank angular velocity ω1 detected immediately before the end of the expansion stroke (combustion bottom dead center BDC) is higher than the average rotational speed Ne. A difference Δω between the minimum crank angular velocity ω0 and the maximum crank angular velocity ω1 represents a load on the engine 5, as will be described later.

A rotational energy increasing amount ΔE in the expansion stroke is obtained by the following Equation 1:

$$\Delta E = \tfrac{1}{2} \cdot Ie \cdot (\omega 1^2 - \omega 0^2) \qquad \text{Equation 1,}$$

where Ie represents the moment of inertia of a crankshaft system.

Because the energy increasing amount ΔE is the engine work by combustion, the energy increasing amount ΔE can be also obtained by the following Equation 2:

$$\Delta E = IMEP \cdot Vs \qquad \text{Equation 2,}$$

where IMEP represents the indicated mean effective pressure, and Vs represents the engine displacement.

Also, the right side of Equation 1 can be transformed into the following Equation 3:

$$\tfrac{1}{2}(\omega 1^2 - \omega 0^2) = (\omega 1 - \omega 0) \cdot \tfrac{1}{2} \cdot (\omega 1 + \omega 0) \qquad \text{Equation 3}$$

The crank angular velocity variation Δω during the expansion stroke is defined by Δω=(ω1−ω0). Also, the right side of Equation 3 is approximately equal to the per-cycle average angular velocity ω, that is, the rotational speed Ne, and therefore can be approximated by the following Equation 4:

$$\tfrac{1}{2}(\omega 1 + \omega 0) = Ne \qquad \text{Equation 4}$$

Based on Equations 1 to 4, the crank angular velocity variation Δω is expressed by the following Equation 5:

$$\Delta\omega = (IMEP \cdot Vs)/(Ie \cdot Ne) \qquad \text{Equation 5,}$$

that is to say, the crank angular velocity variation Δω is proportional to the indicated mean effective pressure IMEP and the displacement Vs, and inversely proportional to the engine rotational speed Ne and the moment of inertia of the crankshaft system.

In this manner, for example, the indicated mean effective pressure IMEP, which represents the engine load, is correlated with the crank angular velocity variation Δω. Therefore, the crank angular velocity variation Δω can be used for an engine load estimate. However, there are various variation factors in measurement of actual equipment, such as the machining accuracy of the reluctor, and the mounting accuracy of the pulse generator PC. Therefore, in order to eliminate the influence of these variation factors, the crank angular velocity variation Δω is obtained using the same reluctor.

More specifically, the minimum crank angular velocity ω0 is substituted by the first crank angular velocity ω10 detected near the compression top dead center TDC. On the other hand, the maximum crank angular velocity ω1 is substituted by the second crank angular velocity ω20 detected near the overlap top dead center OLP corresponding to the position when the crankshaft completes its 360-degree rotation from the compression top dead center TDC. Thus, the crank angular velocity variation Δω is defined by the increment from the first crank angular velocity ω10 to the second crank angular velocity ω20, that is, the crank angular velocity variation Δω360 at a 360° crank angle during the expansion and exhaust strokes.

Figure 4:
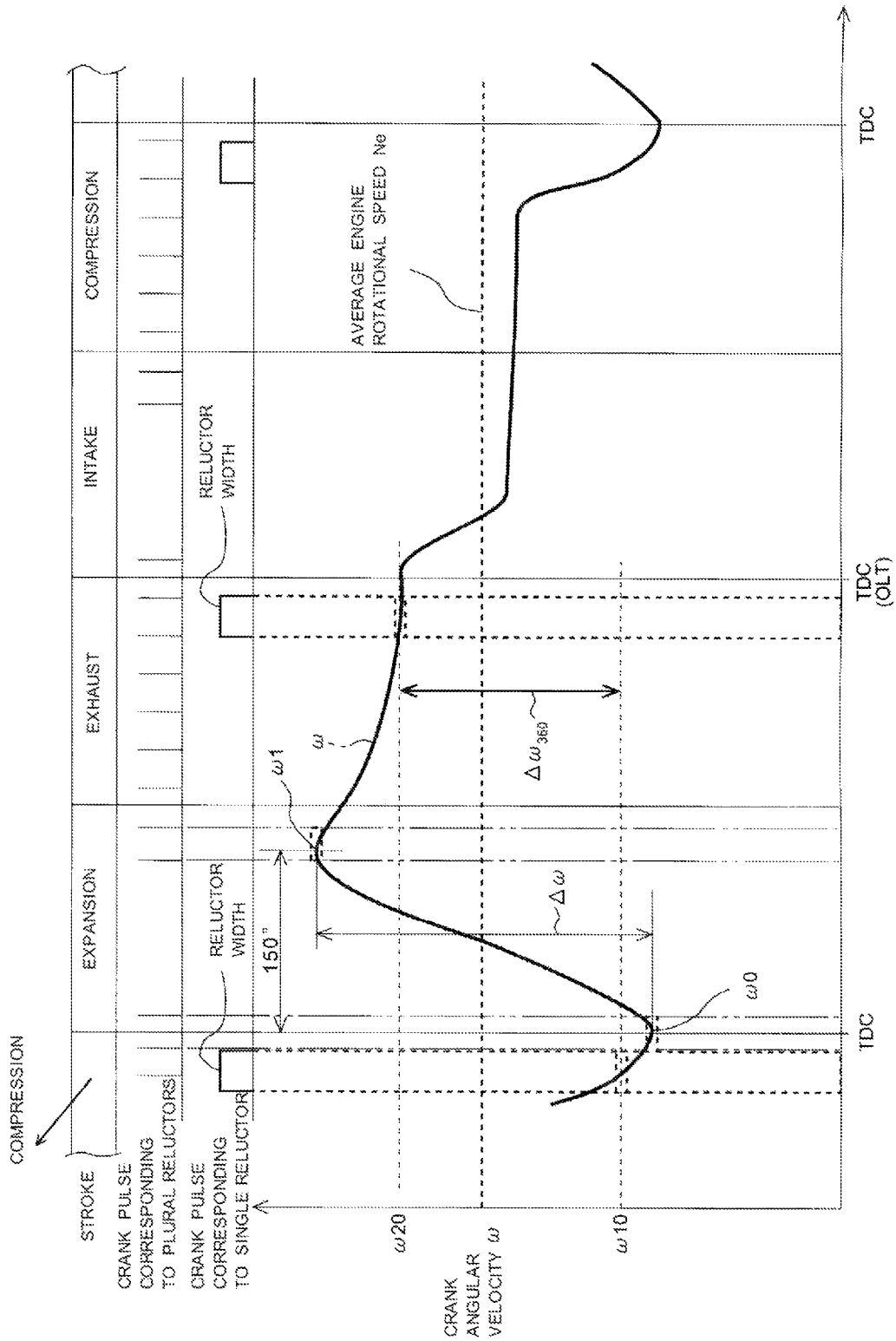
FIG. 4 is a time chart illustrating the relationship between the crank pulse corresponding to a single reluctor and variation in the crank angular velocity ω.

FIG. 4 is a time chart illustrating the relationship between the crank pulse of the crank pulser rotor 2 having the single reluctor 4 and variation in the crank angular velocity ω. The crank angular velocity ω becomes the minimum value ω0 at a starting position of the expansion stroke, that is, near the compression top dead center TDC, and becomes the maximum value ω1 immediately before the end of the expansion stroke (at approximately 150° from the TDC). And then the crank angular velocity ω decreases gradually during the exhaust stroke, and further decreases sharply immediately after the start of the intake stroke. Thereafter, the crank angular velocity ω is almost kept at a value lower than the average engine rotational speed up to the middle of the compression stroke, and starts to decrease to the minimum value ω0 from the second half of the compression stroke.

In an example shown in FIG. 4, the position of the crank pulser rotor 2 is set in such a manner that, of crank pulses output from the pulse generator PC after detection of the front and rear ends of the reluctor 4, the crank pulse corresponding to the rear end corresponds to a crank pulse immediately before (for example, 10° before) the compression top dead center TDC. Thus, crank pulses are generated both immediately before the compression top dead center TDC and after one revolution of the engine, i.e., immediately before the overlap top dead center OLP. The crank pulse widths in the respective positions are detected as the crank angular velocities ω in those positions, namely, the first crank angular velocity ω10 and the second crank angular velocity ω20. The increment Δω360 between the first crank angular velocity ω10 and the second crank angular velocity ω20 is calculated as the crank angular velocity variation.

On the other hand, in addition to the crank pulse corresponding to the single reluctor 4, FIG. 4 also shows a crank angular velocity detecting position according to the related art in which the crank pulse of the crank pulser rotor 2a having the plural of reluctors 4a as shown in FIG. 2 is used. In the related art, the crank angular velocity variation M is obtained, by using the crank pulser rotor 2a, from the minimum crank angular velocity Δω and the maximum crank angular velocity ω1 on the basis of two crank pulses straddling the compression top dead center TDC and two crank pulses at 150° from the compression top dead center TDC. That is to say, the crank pulses corresponding to different reluctors are used.

Figure 5:
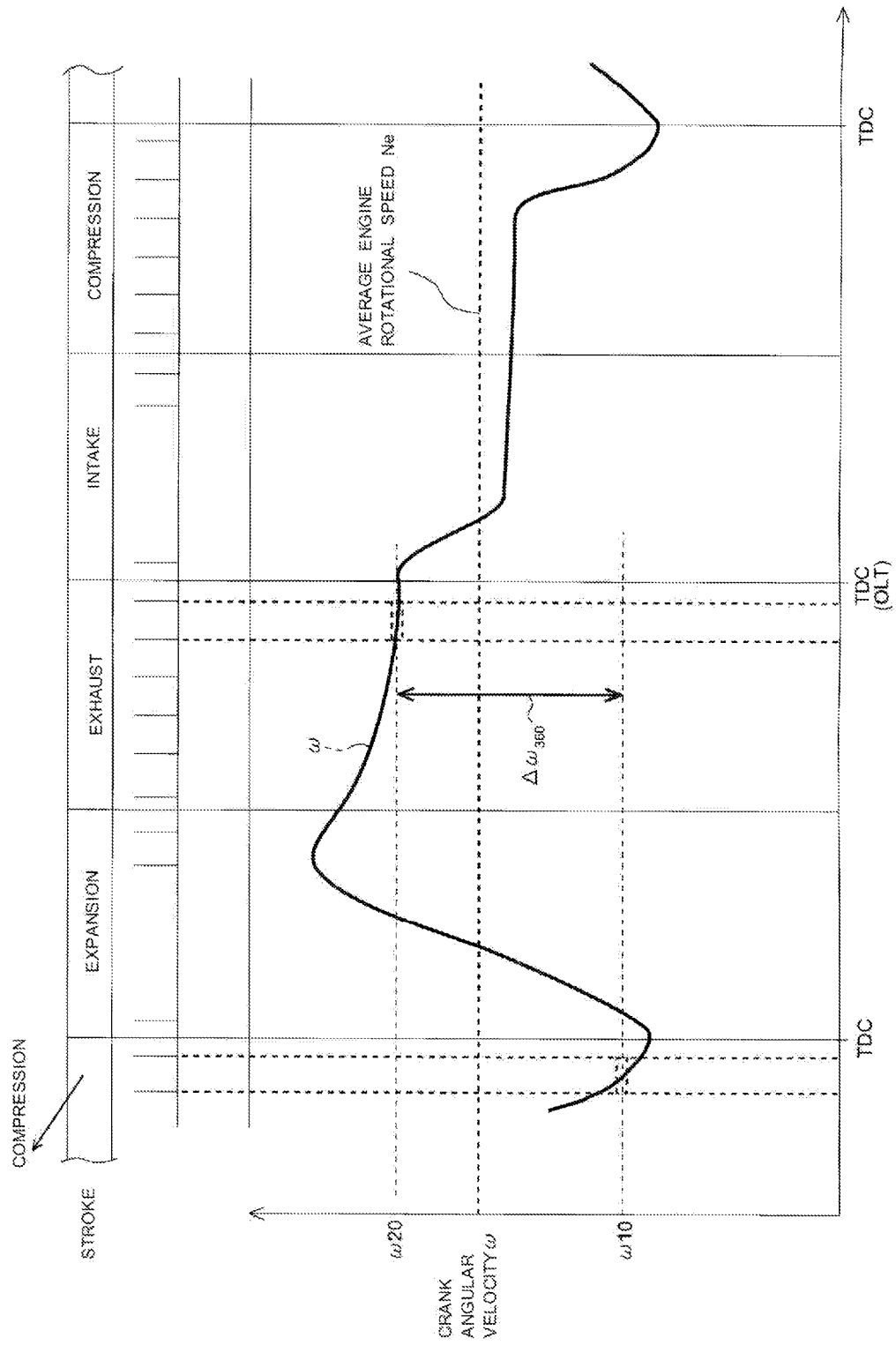
FIG. 5 is a time chart illustrating the relationship between the crank pulse corresponding to the plural of reluctors and variation in the crank angular velocity ω.

FIG. 5 is a time chart illustrating the relationship between the crank pulse of the crank pulser rotor 2a having the plural of reluctors 4a, and variation in the crank angular velocity ω. In FIG. 5, the first crank angular velocity ω10 and the second crank angular velocity ω20 are obtained by using crank pulses from the two reluctors 4a obtained in both positions, immediately before the compression top dead center TDC and immediately before the overlap top dead center OLT, among the plural of reluctors 4a.

In this example, two of the plural of reluctors 4a are commonly used for detection of the first crank angular velocity ω10 and the second crank angular velocity ω20. Thus, the influence of variations in size within mass production tolerances can be eliminated, in the same manner as the case where the crank pulser rotor 2 having the single reluctor 4 is used.

It should be noted that, in a case where the crank angular velocities ω10 and ω20 are obtained near the compression top dead center TDC and the overlap top dead center OLT, the position of the crank pulser rotor 2a may be set in such a manner that two crank pulses straddle the compression top dead center TDC or the overlap top dead center OLT.

Figure 6:
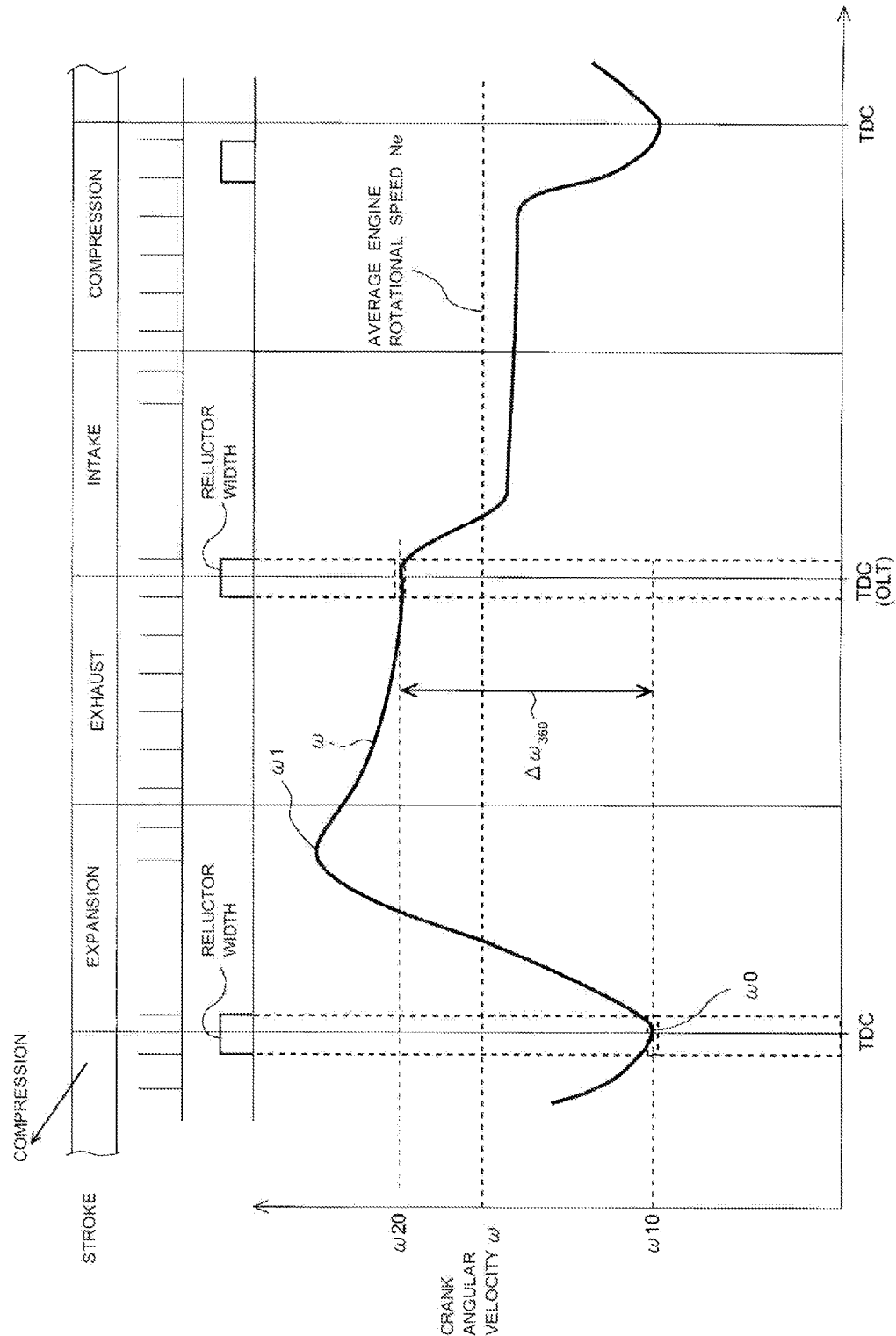
FIG. 6 is a time chart illustrating the relationship between the crank pulse and variation in the crank angular velocity ω, in an example in which the setting is such that the crank pulses corresponding to the single reluctor are output in positions straddling compression top dead center and overlap top dead center.

FIG. 6 is a time chart illustrating the relationship between the crank pulse and variation in the crank angular velocity ω, during one cycle, showing an example in which the position of the crank pulser rotor 2 is set so that two crank pulses straddle the compression top dead center TDC or the overlap top dead center OLT. In the example shown in FIG. 6, the first crank angular velocity ω10 is almost the same value as the minimum crank angular velocity ω0.

It should be also noted that, in view of the sharp decrease of the crank angular velocity ω immediately after transition from the exhaust stroke to the intake stroke, the crank angular velocity ω is preferably obtained immediately before rather than immediately after the compression top dead center TDC, or immediately before rather than immediately after the overlap top dead center OLT.

Here, the meaning of the crank angular velocity variation Δω360 calculated by using the same reluctors will be described. The crank angular velocity variation Δω is proportional to the indicated mean effective pressure IMEP. In this case, however, the indicated mean effective pressure IMEP is indicated mean effective pressure IMEPGROSS covering only the positive work produced during the section from the compression stroke to the expansion stroke.

The present inventors conducted experiments and research, assuming that the angular velocity variation Δω360 per cycle of the engine is correlated with indicated mean effective pressure IMEPNET covering the indicated work over the whole cycle.

Figure 7:
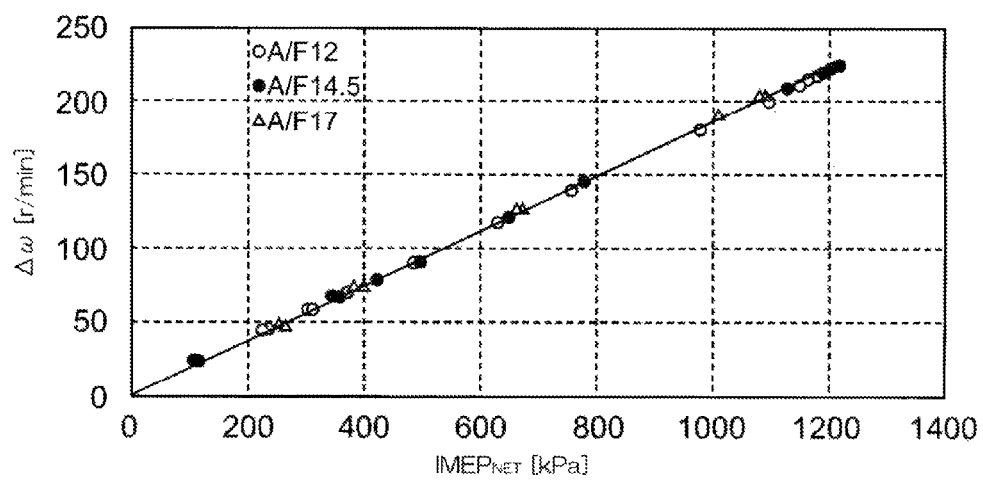
FIG. 7 shows a result of experiments on a correlation between crank angular velocity variation with air-fuel ratio A/F as a parameter, and indicated mean effective pressure IMEPNET covering indicated work over the whole cycle.

FIG. 7 shows a result of experiments on a correlation between the crank angular velocity variation Δω360 with air-fuel ratio A/F as a parameter, and the indicated mean effective pressure IMEPNET covering the indicated work over the whole cycle. It should be noted that the engine is rotated at a constant rate.

Figure 8:
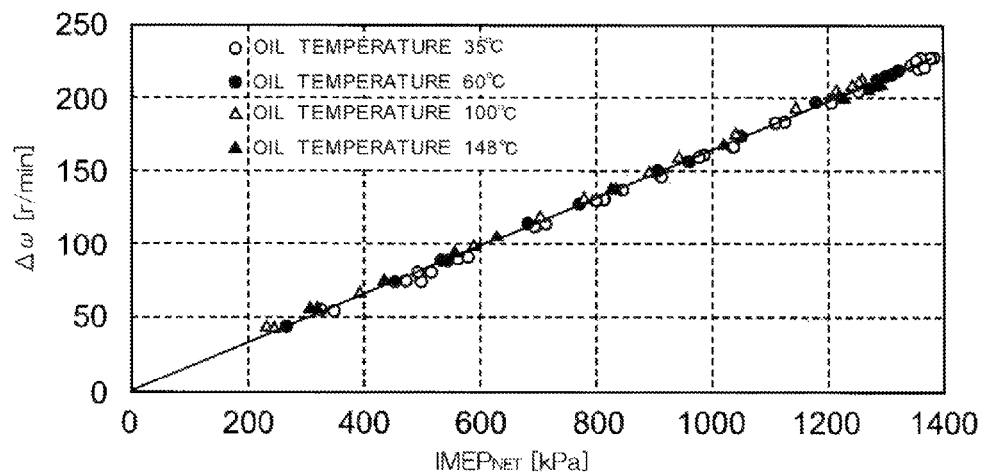
FIG. 8 shows a result of experiments on a correlation between crank angular velocity variation with engine lubricating oil temperature as a parameter, and the indicated mean effective pressure IMEPNET covering the indicated work over the whole cycle.

FIG. 8 shows a result of experiments on a correlation between the crank angular velocity variation Δω360 with engine lubricating oil temperature as a parameter, and the indicated mean effective pressure IMEPNET covering the indicated work over the whole cycle. It should be noted that the engine is rotated at a constant rate.

As can be understood from the experimental results shown in FIGS. 7 and 8, it has been confirmed that the correlation between the crank angular velocity variation Δω360 per cycle and the indicated mean effective pressure IMEPNET is constant irrespective of the air-fuel ratio A/F and the engine lubricating oil temperature. This has shown that the crank angular velocity variation Δω360 has a correlation to the indicated mean effective pressure IMEPNET without being affected by a change in the intake air quantity, and a change in the engine lubricating oil temperature, i.e., the mechanical loss.

Consequently, a load on the engine can be also estimated from a difference between the first crank angular velocity ω10 and the second crank angular velocity ω20, in other words, the crank angular velocity variation Δω360.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. An engine control unit comprising:
a pulse generator that detects a reluctor provided on a crank pulser rotor rotating synchronously with a crankshaft of a single cylinder engine to output crank pulses;
an angular velocity calculator that calculates a first crank angular velocity using a reluctor in a predetermined section near compression top dead center of the engine in a compression stroke and an interval between two crank pulses output in the predetermined section near the compression top dead center of the engine, and detects near overlap top dead center the same reluctor used for calculating the first crank angular velocity to calculate a second crank angular velocity in an exhaust stroke using an interval between two crank pulses output from the pulse generator; and
an engine load estimator that estimates an engine load from a difference between the first crank angular velocity and the second crank angular velocity,
wherein the two crank pulses to be output in each of predetermined sections near the compression top dead center and the overlap top dead center are output at a time of detection of front and rear ends of a single reluctor provided on the crank pulser rotor.

2. The engine control unit according to claim 1, wherein a relationship between the reluctor and the crankshaft is set such that the two crank pulses to be output in each of predetermined sections near the compression top dead center and the overlap top dead center are output in positions immediately before the compression top dead center and the overlap top dead center.

3. The engine control unit according to claim 2, wherein the engine load estimator estimates the engine load from indicated mean effective pressure over a whole cycle of the engine including a pumping loss that is negative work done by the engine.

4. The engine control unit according to claim 1, wherein the engine load estimator estimates the engine load from indicated mean effective pressure over a whole cycle of the engine including a pumping loss that is negative work done by the engine.

5. An engine control unit comprising:
a pulse generator that detects a reluctor provided on a crank pulser rotor rotating synchronously with a crankshaft of a single cylinder engine to output crank pulses;
an angular velocity calculator that calculates a first crank angular velocity using a reluctor in a predetermined section near compression top dead center of the engine in a compression stroke and an interval between two crank pulses output in the predetermined section near the compression top dead center of the engine, and detects near overlap top dead center the same reluctor used for calculating the first crank angular velocity to calculate a second crank angular velocity in an exhaust stroke using an interval between two crank pulses output from the pulse generator; and
an engine load estimator that estimates an engine load from a difference between the first crank angular velocity and the second crank angular velocity,
wherein a relationship between the reluctor and the crankshaft is set such that the two crank pulses to be output in each of predetermined sections near the compression top dead center and the overlap top dead center are output in positions of the same physical reluctor straddling both the compression top dead center in the compression stroke and the overlap top dead center in the exhaust stroke.

6. The engine control unit according to claim 5, wherein the two crank pulses to be output in each of predetermined sections near the compression top dead center and the overlap top dead center are output at a time of detection of front and rear ends of a single reluctor provided on the crank pulser rotor.

7. The engine control unit according to claim 5, wherein the engine load estimator estimates the engine load from indicated mean effective pressure over a whole cycle of the engine including a pumping loss that is negative work done by the engine.

8. A method of controlling an engine with an engine control unit comprising:
- detecting, by a pulse generator, a reluctor provided on a crank pulser rotor rotating synchronously with a crankshaft of a single cylinder engine to output crank pulses;
- calculating, by the engine control unit, a first crank angular velocity using a reluctor in a predetermined section near compression top dead center of the engine in a compression stroke and an interval between two crank pulses output in the predetermined section near the compression top dead center of the engine, and detecting near overlap top dead center of the same reluctor used for calculating the first crank angular velocity to calculate a second crank angular velocity in an exhaust stroke using an interval between two crank pulses output from the pulse generator; and
- estimating, by the engine control unit, an engine load from a difference between the first crank angular velocity and the second crank angular velocity,
- wherein the two crank pulses to be output in each of predetermined sections near the compression top dead center and the overlap top dead center are output at a time of detection of front and rear ends of a single reluctor provided on the crank pulser rotor.

9. The method of controlling an engine according to claim 8, wherein a relationship between the reluctor and the crankshaft is set such that the two crank pulses to be output in each of predetermined sections near the compression top dead center and the overlap top dead center are output in positions immediately before the compression top dead center and the overlap top dead center.

10. The method of controlling an engine according to claim 8, further comprising: estimating the engine load from indicated mean effective pressure over a whole cycle of the engine including a pumping loss that is negative work done by the engine.

11. A method of controlling an engine comprising:
- detecting, by a pulse generator, a reluctor provided on a crank pulser rotor rotating synchronously with a crankshaft of a single cylinder engine to output crank pulses;
- calculating, by the engine control unit, a first crank angular velocity using a reluctor in a predetermined section near compression top dead center of the engine in a compression stroke and an interval between two crank pulses output in the predetermined section near the compression top dead center of the engine, and detecting near overlap top dead center of the same reluctor used for calculating the first crank angular velocity to calculate a second crank angular velocity in an exhaust stroke using an interval between two crank pulses output from the pulse generator; and
- estimating, by the engine control unit, an engine load from a difference between the first crank angular velocity and the second crank angular velocity,
- wherein a relationship between the reluctor and the crankshaft is set such that the two crank pulses to be output in each of predetermined sections near the compression top dead center and the overlap top dead center are output in positions of the same physical reluctor straddling both the compression top dead center in the compression stroke and the overlap top dead center in the exhaust stroke.

12. The method of controlling an engine according to claim 11, wherein the two crank pulses to be output in each of predetermined sections near the compression top dead center and the overlap top dead center are output at a time of detection of front and rear ends of a single reluctor provided on the crank pulser rotor.

* * * * *